(No Model.) 2 Sheets—Sheet 1.
F. BALBIAN.
STEAM COUPLING AND AUTOMATIC PARTING AND CUT-OFF DEVICE.
No. 483,987. Patented Oct. 11, 1892.
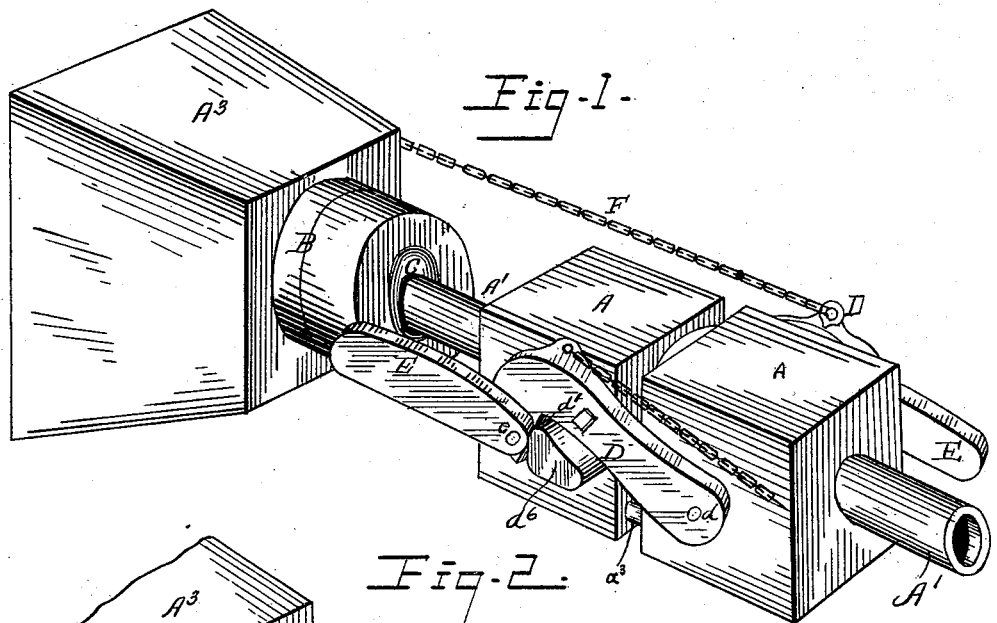
*Fig-1-*
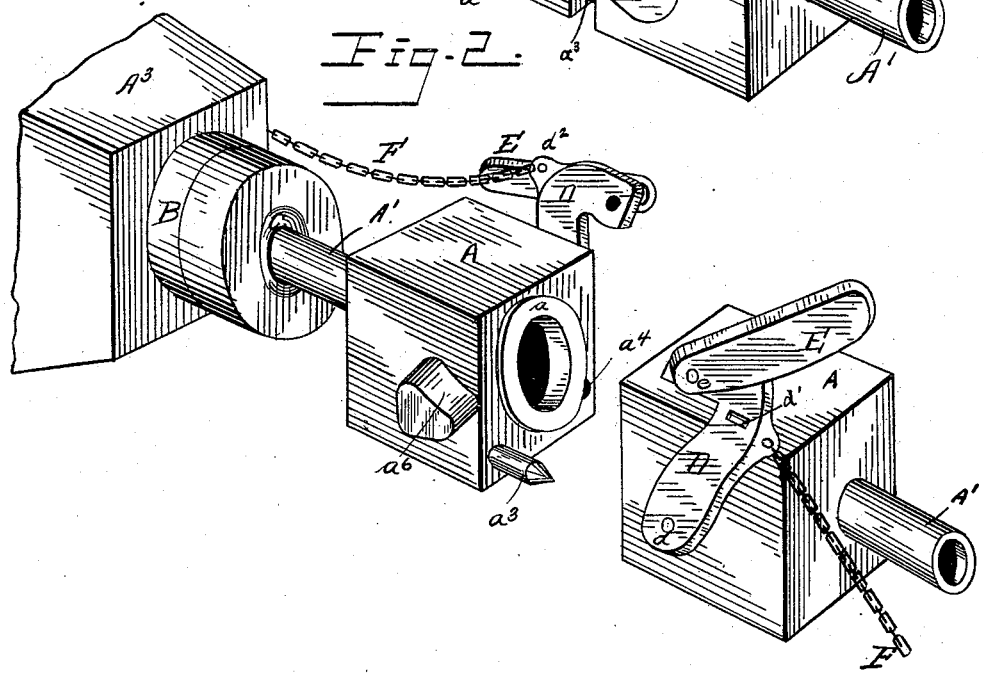
*Fig-2-*
Witnesses:
L. S. Thomason
W. S. Duvall
Frederick Balbian
Inventor:
R. M. Kelly, Principal Attorney
by Chas. J. Stockman
Associate Attorney (No Model.) 2 Sheets—Sheet 2.

F. BALBIAN.
STEAM COUPLING AND AUTOMATIC PARTING AND CUT-OFF DEVICE.

No. 483,987. Patented Oct. 11, 1892.

Witnesses
Louis A. Thomason
W. S. Duvall

Inventor:
Frederick Balbian.
By Chas. J. Stockman
Asso. Atty

UNITED STATES PATENT OFFICE.

FREDERICK BALBIAN, OF LOUISVILLE, KENTUCKY, ASSIGNOR OF ONE-HALF TO HENRY BALBIAN, OF SAME PLACE.

STEAM-COUPLING AND AUTOMATIC PARTING AND CUT-OFF DEVICE.

SPECIFICATION forming part of Letters Patent No. 483,987, dated October 11, 1892.

Application filed March 7, 1892. Serial No. 423,990. (No model.)

*To all whom it may concern:*

Be it known that I, FREDERICK BALBIAN, a citizen of Bavaria, residing at Louisville, in the county of Jefferson and State of Kentucky, have invented certain new and useful Improvements in Steam-Coupling and Automatic Parting and Cut-Off Devices; and I do hereby declare the following to be a full, clear, and exact description of the invention, such as will enable others skilled in the art to which it appertains to make and use the same.

My invention relates to the class of couplings that are adapted for use on pipes or hose for conveying steam, air, or water, and particularly intended for use on the pipes of the heating or brake system of railway-trains.

The object of my invention is to provide a coupling that may be readily operated and will form a tight joint, and also to provide means by which when railway-cars provided in their heating or braking system with my couplings are separated the couplings will be automatically parted by the separation of the cars and at the same time the steam be shut off at each end of the pipes.

Figure 3:
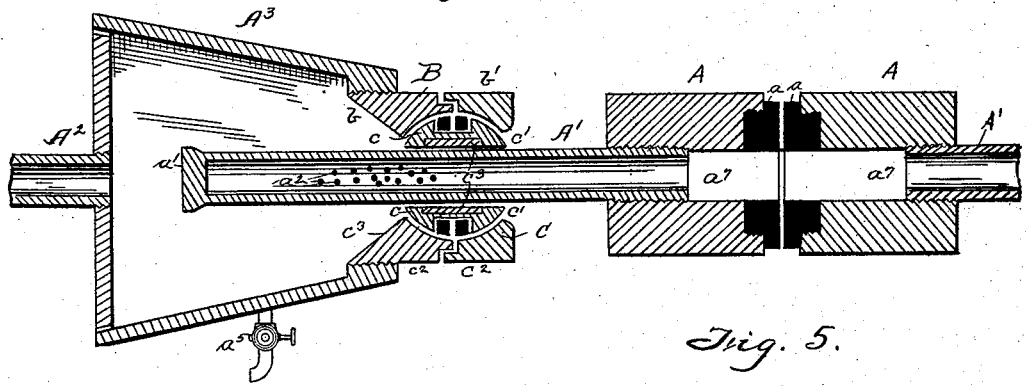
Figures 4, 5:
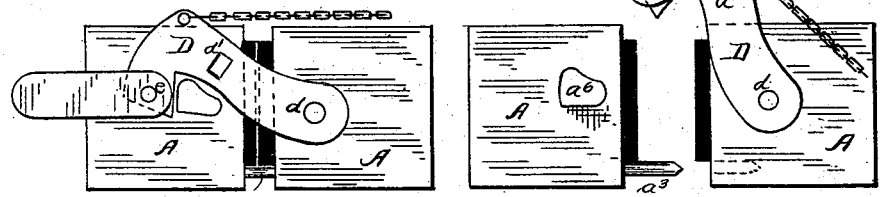
Figures 6, 7:
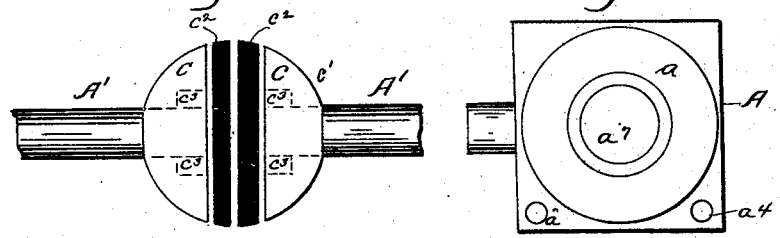

Referring to the drawings, Figure 1 is a perspective view of a coupling embodying my invention, showing the coupling closed. Fig. 2 is a perspective view of the same before coupling. Fig. 3 is a central longitudinal section of my coupling and steam-shut-off device. Fig. 4 is a side elevation of the body parts of the coupling fastened together. Fig. 5 is a side elevation showing the same parts uncoupled. Fig. 6 is a detail of the ball-and-socket joint of the steam-cut-off device and of the pipe passing through it. Fig. 7 is an elevation of one of the communicating ends of the body parts of the coupling.

Similar letters of reference refer to similar parts throughout.

A A indicate the two body parts of the coupling, which are preferably cubical in shape and have each a circular aperture or steamway $a^7$ through it from front to rear on its medial line. At the ends facing each other the body parts are mortised out around the aperture to furnish seats for the exteriorly-screw-threaded shanks of the gaskets $a$ $a$, the mortised parts being provided with screw-threads on their interior surfaces, adapted to engage the threads on the gasket-shanks. These gaskets $a$ $a$ are preferably made of vulcanized asbestos. Into the mouths of the apertures at the other ends of the body parts are firmly screwed sections of pipe $A'$ $A'$, the pipe-sections being screw-threaded externally and the aperture in the coupling-body screw-threaded internally to engage each other. The ends of these pipe-sections $A'$, that are screwed into the body parts of the coupling, are open; but the other ends are closed by flanged caps $a'$ and perforated at suitable distances from the closed ends by a series of holes $a^2$. The closed ends of the pipe-sections $A'$ are left free in steam-boxes $A^3$, each preferably shaped like a truncated pyramid with its smaller base toward the coupling-bodies A. In the smaller base of each of these boxes is a circular aperture provided with screw-threads on its interior surface, adapted to engage the screw-threaded socket of a ball-and-socket joint B, which has a circular aperture through it adapting it to fit over the pipe-section $A'$.

$A^2$ represents the end of a pipe which forms part of the circulatory system of steam heating or braking apparatus as used on cars. It is screw-threaded and adapted to engage a threaded aperture in the larger base of the steam-box $A^3$.

The socket-case of the ball-and-socket joint B is cylindrical exteriorly and constructed in two sections $b$ and $b'$. The base-section $b$ carries a screw-thread around the lower part of its surface to engage the screw-threaded aperture in the smaller base of the steam-box $A^3$, and has a threaded mortise round its top edge to engage a threaded tongue on the cap-section $b'$ by which they may be tightly screwed together. The inner and outer apertures of the sockets are enlarged and the socket-case cut away slopingly from the aperture, as shown in Fig. 3, to allow free play to the pipe $A'$, as hereinafter indicated.

C, which represents the ball of the ball-andsocket joint, is made in two hemispheres $c$ and $c'$, each of which has a groove or mortise in its surface around the communicating equator to furnish a seat for the gaskets or washers $c^2$. The ball C, as before stated, has a circular aperture diametrically through it to receive the pipe-section A' and is hollow to receive the interior packing $c^3$ around the pipe necessary to make the joint steam-tight.

Each of the coupling-bodies A has near the lower edge of its communicating front a projecting pin $a^3$ and a socket-hole $a^4$ so placed that the pin in one part will be opposite the socket in the other.

The steam-box $A^3$ is provided with a cock $a^5$ to withdraw the water of condensation.

The means of fastening the coupling may be described as follows: On opposite sides of each of the body parts A are clasping-latches D, attached to A by pivot-bolts $d$. Each latch has a hooked end adapted to fit over a catch-lug $a^6$ on the side of each body part opposite to the side to which the latch is pivoted. These catch-lugs are preferably cast on the body parts. To the back end of each of the latches D is pivoted a cam-holding lever E by a pin $e$, and on each of the latches is a lug $d'$, adapted to form a back rest or stop for the lever E when the coupling is open. To each latch D is attached by means of an eye $d^2$ a chain F, the other end of which is fastened to the steam-box $A^3$.

The operation of my device may be described as follows: When it is desired to couple the steam-pipes of cars provided with it, the parts being in the position indicated in Fig. 2, the body parts A are brought together, so that the post $a^3$ on each will enter the hole $a^4$ on the other. The fastening-latch D on each is then shut down over the catch-lugs $a^6$ on the other and the cam-locking lever E is thrown forward to tighten the coupling, thus putting the parts in the position indicated in Fig. 1. The closed end of the pipe-section A' being loose in the steam-box $A^3$, the coupling is allowed by the open mouths of the socket-case all the play required by the jostling caused by passing around curves or the roughness of the track. The steam enters the steam-box $A^3$ at the end of the coupling next the steam-supply by the pipe $A^2$, and from the steam-box enters the pipe-section A' through the series of perforations $a^2$ in it, then passes through the pipe-section A' and through the aperture in the coupling-bodies A, the joint between which is made tight by the gaskets $a$, then into the other pipe-section A' and out through the perforations $a^2$ in it into the steam-box $A^3$ at the end of the coupling farthest from the steam-supply, and from it by way of the pipe $A^2$ into the circulatory system of the next car. The chains F are of such length as to hang loosely when the coupling is closed, in order not to pull on the fastening-clasps under the ordinary jostling of a train.

When cars coupled by my device are pulled apart, the strain on the chains F, which take up the slack in it, first lengthens the couplings by pulling the loose ends of the pipe-sections A' toward the ball-and-socket joint till the perforations $a^2$ in those sections are outside the joint, and then lifts the fastening-latches from the catches $a^6$ and allows the coupling-bodies A to part. As soon as the perforations $a^2$ in the pipes A' are exterior to the steam-boxes $A^3$ the steam is cut off, as the packing in the ball C around the pipe prevents any escape of steam through that joint.

The socket and ball are made in sections, as described, in order to enable the packing to be renewed as often as required to keep it steam-tight.

Having thus described my invention, what I claim as new, and desire to secure by Letters Patent, is—

1. In a device of the character herein described, the combination, with the body portions A, provided with coupling means, steam-boxes $A^3$, and pipes connecting said body portions and steam-boxes, the ends of the pipes within said steam-boxes being closed and said pipes having the perforations $a^2$ adjacent to the ends of the steam-boxes, of ball-and-socket joints at the ends of said steam-boxes, through which said pipes extend, gaskets within said joints, said gaskets surrounding said pipes, and chains connecting said body portions and steam-boxes in the manner described, whereby the parting of the cars will cause said chains to draw the perforated portions of the pipes from the steam-boxes into position, where the perforations will be closed by the gaskets in the joints, as specified.

2. In a device of the character herein described, the combination, with the body portions A, said body portions having lugs $a^6$, and latches pivoted at their ends to said body portions and adapted to engage said lugs, of steam-boxes, pipes connecting said body portions and steam-boxes, said pipes having their ends within the steam-boxes closed and formed at or near the forward end of the steam-boxes with perforations, joints at the ends of said steam-boxes through which said pipes pass, gaskets in said joints, said gaskets surrounding the pipes adjacent to the perforations thereof, and chains secured to the latches and to the steam-boxes, substantially as described, whereby the parting of a train causes the chains to first draw the perforated portions of the pipes out of the steam-boxes into positions where the perforations will be closed by the gaskets in the joints, thus cutting off the steam and then to raise the latches to permit the body portions to separate, as specified.

3. The combination, with the body portions, steam-chests, and connecting steam-pipes, of the sockets B, secured to the open ends of the steam-chests, said sockets being made in two parts $b\ b'$, removably fastened together, and the balls C within said sockets, each of said balls being made in sections and formed with external and internal recesses and also with an opening for the passage of the steam-pipe, and gaskets within said recesses in the balls, all substantially as shown and described.

In testimony whereof I affix my signature in presence of two witnesses.

FREDERICK BALBIAN.

Witnesses:
JAMES W. GARRISON,
J. K. SHRADER.